United States Patent [19]

Schwarze et al.

[11] 4,070,531
[45] Jan. 24, 1978

[54] ANTISTATIC AGENTS FOR THERMOPLASTIC SYNTHETIC RESINS

[75] Inventors: Werner Schwarze, Frankfurt; Wolfgang Merk; Volker Binder, both of Hanau, all of Germany

[73] Assignees: Deutsche Gold- und Silber-Scheideanstalt Vormals Roessler, Frankfurt; Henkel & Cie. GmbH, Dusseldorf-Holthausen, both of Germany

[21] Appl. No.: 653,834

[22] Filed: Jan. 30, 1976

[30] Foreign Application Priority Data

Jan. 31, 1975    Germany ............................. 2504054

[51] Int. Cl.² .............................................. C08K 5/17
[52] U.S. Cl. ........................................... 526/6; 526/2; 526/3; 526/5; 260/DIG. 19; 260/DIG. 20
[58] Field of Search ....................... 526/2, 3, 4, 5, 6; 260/32.6 R, 32.6 PQ, DIG. 16, DIG. 19, DIG. 20

[56] References Cited

U.S. PATENT DOCUMENTS 2,897,170   7/1959   Gruber ......................... 260/32.6 PQ
3,371,130   2/1968   Seifert ...................................... 526/6

Primary Examiner—Paul R. Michl
Attorney, Agent, or Firm—Cushman, Darby & Cushman

[57] ABSTRACT

There are used as antistatic agents for thermoplastic synthetic resins compounds of the formulae

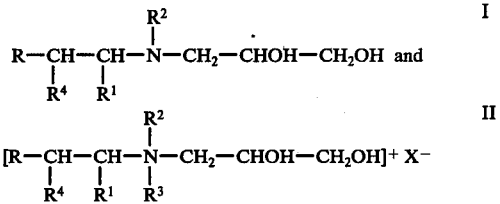

where R and R' are saturated alkyl groups in which the sum of the carbon atoms in the two alkyl groups is 4 to 30 carbon atoms and wherein one of R and R' can be hydrogen, $R^2$ is hydrogen, lower alkyl with one to 5 carbon atoms, 2-hydroxyethyl, 2-hydroxypropyl, 2,3-dihydroxypropyl, benzyl o-,m- and/or p-methylbenzyl, o-,m- and/or p-chlorobenzyl, o-,m- and/or p-bromobenzyl, aminoalkyl ($C_2$ to $C_6$), preferably aminoalkyl ($C_2$ and $C_3$), alkyl ($C_1$ to $C_6$)-aminoalkyl ($C_2$ to $C_6$), 2-hydroxyethyl-aminoalkyl ($C_1$ to $C_6$), 2-hydroxypropyl-aminoalkyl ($C_2$ to $C_6$) or 2,3-dihydroxypropyl-aminoalkyl ($C_2$ to $C_6$), $R^3$ in case the compound is present as the ammonium salt is hydrogen or a lower alkyl group with 1 to 5 carbon atoms, $R^4$ is hydrogen or hydroxyl, and $X^-$ is a monovalent, inorganic or organic acid group or one equivalent of a polybasic inorganic or organic acid group.

The antistatic compounds can be premixed with silica to give enhanced antistatic activity.

13 Claims, No Drawings

ANTISTATIC AGENTS FOR THERMOPLASTIC SYNTHETIC RESINS

The present application is related to our copending application Ser. No. 653,835 filed on even date and entitled "N-2,3-Dihydroxypropyl-N-2'-Hydroxyalkyl-Amine and its Salts" claiming the benefit of German application 2504053.3-42. The entire disclosure of the copending United States application is hereby incorporated by reference and relied upon.

The electrostatic charging of thermoplastic synthetic resins such as for example mono-olefin polymers, e.g., polyethylene and polypropylene, polystyrene, polyvinyl chloride and polymethyl methacrylate leads to known difficulties in the production, working and use of products made therefrom such as films, fibers, sheets, tubes and other molded articles as well as lacquers.

The charging with static electricity can be prevented or reduced by materials which are applied to the surface of the synthetic resin. These materials are designated as external antistatic agents. The thin layer produced, however, only acts as long as it is not mechanically removed from the surface, for example by wiping off, abrading, washing off and the like. The effect of such materials is substantially permanent when they are added before the processing of the synthetic resin. The materials so used are called internal antistatic agents. Together with the initial antistatic activity these should also display a long lasting effect, be effective in the least possible concentration, be odorless and have the lowest possible toxicity. Furthermore, they should not lead or contribute to surface tackiness of the synthetic resin products and they should not negatively influence the thermal stability, color, transparency, mechanical properties or use properties of the synthetic resins. Especially the antistatic agents should not have any interaction with the other synthetic resin additives, e.g., antioxidants and UV absorbers, and should not impair the working properties of the synthetic resins. The problem of the invention therefore was to find easily accessible materials which could be synthesized at low cost which satisfy these high requirements for antistatic agents, especially as internal antistatic agents.

It has now been unexpectedly found that compounds of the formulae

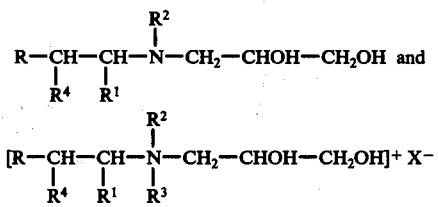

where

R and $R^1$ are saturated alkyl groups in which the sum of the carbon atoms in the two alkyl groups is 4 to 30 carbon atoms and wherein one of R and R' can be hydrogen, $R^2$ is hydrogen, lower alkyl with one to 5 carbon atoms, 2-hydroxyethyl, 2-hydroxypropyl, 2,3-dihydroxypropyl, benzyl, o-,m- and/or p-methylbenzyl, o-,m- and/or p-chlorobenzyl, o-,m- and/or p-bromobenzyl, aminoalkyl ($C_2$ to $C_6$), preferably aminoalkyl ($C_2$ and $C_3$), alkyl ($C_1$ to $C_6$)-aminoalkyl ($C_2$ to $C_6$), 2-hydroxyethyl-aminoalkyl ($C_2$ to $C_6$), 2-hydroxypropyl-aminoalkyl ($C_2$ to $C_6$) or 2, 3-dihydroxypropyl-aminoalkyl ($C_2$ to $C_6$), $R^3$ in case the compound is present as the ammonium salt is hydrogen or a lower alkyl group with 1 to 5 carbon atoms, $R^4$ is hydrogen or hydroxyl, and $X^-$ is a monovalent, inorganic or organic acid group or one equivalent of a polybasic inorganic or organic acid group.

Especially the anions $CH_3SO_4^-$, $C_2H_5SO_4^-$, $ClO_4^-$, $R^5$-COO$^-$ [where $R^5$ is H, alkyl ($C_1$, $C_2$ or $C_3$), $CH_2OH$, $CH_3$ CHOH or $C_6H_5$], $NO_3^-$, Cl$^-$, $R^6SO_3^-$ [where $R^6$ is $CH_3$, $C_6H_5$

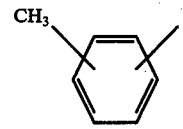

or (HO)$C_2H_4$] or an equivalent of the anions $SO_4^=$, $HPO_4^=$ or $R^7$ (COO)$_2^=$ [where $R^7$ is a simple direct bond, —(CH$_2$)$_x$— where x is 1 to 4, —CH=CH—, —CH(OH)—CH(OH)—, —CH$_2$—C(OH) (COOH)—CH$_2$— or

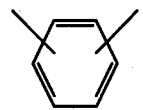

], are especially well suited as agents for imparting antistatic properties to or destaticization of the thermoplastic synthetic resins.

The named groups R and $R^1$ are preferably linear alkyl groups having preferably a total of 4 to 20 carbon atoms, especially when $R^4$ is hydroxy.

The compounds of formulae I and II can be prepared by known methods or as described in our copending United States application set forth above. As starting materials there can be employed either fatty amines which are reacted with one or two moles of glycidol, namely in the manner described for example by E. Ulsperger and R. Dehns, J. Prakt. Chemie Vol. 27, pages 195-212 (1965). The entire disclosure of Ulsperger et al is hereby incorporated by reference and relied upon. Alternatively there can be reacted terminal or internal 1,2-epoxides, which are easily accessible from industrial olefins, with ammonia or short chain aliphatic amines, etc. to form primary or secondary hydroxyamines as is shown for example, in H. Shibata and S. Matsuda, Bull. Jap. Petrol. Inst. Vol. 7, pages 25-30 (1965). The entire disclosure of Shibata et al is hereby incorporated by reference and relied upon. These hydroxyamines can then like the fatty amines be reacted with glycidol. Thus there can be used as starting epoxides 1,2-epoxides such as 1,2-epoxydecane, 1,2-epoxydodecane, 1,2-epoxyhexadecane, 1,2-epoxytetracosane, 1,2-epoxyoctadecane, 1,2-epoxyeicosane, 1,2-epoxytriacontane, 2,3-epoxydodecane, 5,6-epoxydodecane, 7,8-epoxyoctadecane, 9,10-epoxyoctadecane, 10,11-epoxyeicosane.

As stated these 1,2-epoxides can be converted to hydroxylamines by reaction with ammonia or short chain aliphatic amines such as alkylamines, e.g., methyl amine, ethyl amine, propyl amine, isopropyl amine, butyl amine, sec. butyl amine, t-butyl amine, amyl amine, as well as other aliphatic amines, aralkyl amines and haloaralkyl amines such as ethanolamine, 2-hydroxypropyl amine, 2,3-dihydroxypropyl amine, benzyl amine, o-methylbenzyl amine, m-methylbenzyl amine, p-methylbenzyl amine, o-chlorobenzyl amine, m-chlorobenzyl amine, p-chlorobenzyl amine, o-bromobenzyl amine, m-bromobenzyl amine, p-bromobenzyl amine, ethylene diamine, propylene diamine, trimethylene diamine, tetramethylene diamine, pentamethylene diamine, hexamethylene diamine, N-methyl ethylene diamine, N-ethyl ethylene diamine, N-amyl ethylene diamine, N-methyl trimethylene diamine, N-methyl hexamethylene diamine, N-(2-hydroxyethyl) ethylene diamine, N-(2-hydroxyethyl) trimethylene diamine, N-(2-hydroxyethyl) hexamethylene diamine, N-(2-hydroxypropyl) ethylene diamine, N-(2-hydroxypropyl) trimethylene diamine, N-(2-hydoxypropyl) hexamethylene diamine, N-(2,3-dihydroxypropyl) ethylene diamine, N-(2,3-dihydroxypropyl) trimethylene diamine and N-(2,3-dihydroxypropyl) hexamethylene diamine. Corresponding dialkylamines can also be used, e.g., dimethyl amine, dipropyl amine, dibutyl amine, diamyl amine, methyl ethyl amine, etc.

As occasion demands the secondary and tertiary hydroxy amines produced in the ways described above can be neutralized with preferably inorganic acids but also organic acids to obtain the salts. Thus there can be used for example nitric acid, perchloric acid, hydrochloric acid, hydrobromic acid, sulfuric acid, phosphoric acid, dimethyl sulfate, diethyl sulfate, dibutyl sulfate, diamyl sulfate, etc. or organic acids such as formic acid, acetic acid, propionic acid, butyric acid, lactic acid, glycolic acid, benzoic acid, oxalic acid, malonic acid, succinic acid, glutaric acid, adipic acid, maleic acid, fumaric acid, tartaric acid, citric acid, phthalic acid, isophthalic acid, terephthalic acid, methanesulfonic acid, benzenesulfonic acid, p-toluenesulfonic acid, o-toluene-sulfonic acid, hydroxyethanesulfonic acid. The particular acid is not critical.

The excellent antistatic effect of the new compounds in thermoplastic synthetic resins is particularly surprising because similarly constructed known compounds produce substantially poorer results. For comparison, there were tested under otherwise equal conditions the compounds of Braus U.S. Pat. No. 3,308,111, Braus U.S. Pat. No. 3,317,505 and Adams U.S. Pat. No. 3,365,435 with the result that they had a much weaker effect. Also the alkyl bis (hydroxyethyl) amine of Funatsu German Offenlegungsschrift 1,694,525 when incorporated in high pressure polyethylene had very poor antistatic activity with a surface resistance of $\geq 10^{13}$.

The new antistatic agents are outstandingly suited for use in thermoplastic synthetic resins, in amounts of 0.01 to 5% based on the weight of the synthetic resin, especially in high pressure polyethylene, low pressure polyethylene, polypropylene, polystyrene, polyvinyl chloride, polyvinyl acetate, polymethyl methacrylate and in copolymers of ethylene and propylene, ethylene and vinyl acetate, as well as styrene and acrylonitrile, as well as polybutadiene. They are also useful in thermoplastic resins such as chlorinated polyethylene, chlorinated polypropylene, polyacrylonitrile, acrylonitrile-vinyl acetate copolymer, acrylonitrile-vinyl chloride copolymer, vinylidene chloride-acrylonitrile copolymer, vinylidene chloride-vinyl chloride copolymer, polyvinylidene chloride, polyvinyl acetate, polyvinyl acetals, polyvinyl ethers, polyvinyl ketones, nylon 6, nylon 6,6, nylon 6,10, nylon 11, nylon 12, linear polyesters, e.g. polyethylene terephthalate, linear polyurethanes, polyoxymethylene, polycarbonates, cellulose acetate, cellulose butyrate, cellulose acetate-propionate,, cellulose acetatebutyrate, etc.

Preferably, the antistatic agents are used in polyolefins, polyvinyl chloride (hard and plasticized) and polymethacrylates, e.g. alkyl methacrylates, in amounts of from 0.01 to 5%, preferably 0.1 to 3% based on the weight of the synthetic resin, whereby, particularly at optimal concentration, there is produced an antistatic effect immediately after addition, which effect obtains its maximum value within 24 hours. The antistatic agents besides are easily worked into the thermoplastic synthetic resins, do not impair the working or processing properties of the synthetic resins, as, for example the bondability and weldability and do not cause contact tackiness and as a rule can be washed out with water only with difficulty.

It has proven particularly advantageous that the antistatic agents of the invention on the one hand only migrate out of the synthetic resin to the surface to such an extent that the concentration of antistatic agent present there is sufficient to reduce the surface resistance to an optimum extent, for example from $10^{14}$ ohms (a value which is measured for most nonantistaticized synthetic resins) to $10^8$ to $10^{10}$ ohms, however, on the other hand have a sufficient effect immediately after the processing of the synthetic resin. The new antistatic agents in general are without a disturbing odor and do not (or only insignificantly) influence the color, transparency, the mechanical properties and the thermal properties of the synthetic resins.

Advantageously the antistatic agents of the invention can be admixed with small amounts of a pure silica or a silica gel whereby the working into the synthetic resin is made easier and the antistatic activity is somewhat improved. Simultaneously, there is imparted thereby an antiblocking effect (no firm adherence) to the synthetic resin without the addition of a further assistant. Among the silicas there are included those precipitated in the aqueous phase, but especially there are used pyrogenically produced silicas with over 98% purity and for example surface areas in the order of magnitude of about 50 to 500, preferably 100 to 400 m²/g, in each case with measuring accuracy of ± 25 m²/g (with nitrogen, measured according to the known method of BET) and average primary particle sizes of less than 500, preferably in the range of about 5 to 100 nm (=millimicron=/nanometers).

Likewise among the objects of the invention are the containing or consisting of at least one compound of the general formulae I and II above with the likewise above given meanings for the groups R, $R^1$ to $R^4$ and the anion $X^-$ for destaticization or imparting antistatic properties to the thermoplastic synthetic resins.

These agents of the invention are further characterized in that they can contain in homogenous distribution silica ($SiO_2$) in amounts of 1 to 500 parts by weight per 100 parts by weight of the antistatically active compound or compounds of formulae I and II. Preferably in these agents the silica is a pure highly dispersed silica with a specific surface area between 100 and 400 m²/g (measured according to BET) and average primary particle size in the range of 5 to 100, preferably 5 to 50 nm, prepared pyrogenically, for example by flame hydrolysis of silicon tetrachloride.

An advantageous modification of the agent of the invention consists of a homogenous distribution of at least one antistatic agent of the above formulae I and II in amounts of 0.1 to 20 parts by weight and a thermoplastic synthetic resin in an amount of 100 parts by weight. A further modification of the agent of the invention consists of a homogenous distribution of at least one antistatic agent of the above formulae I and Ii in an amount of 0.1 to 20 parts by weight, silica in an amount of 0.1 to 40 parts by weight and thermoplastic synthetic resin in an amount of 100 parts by weight.

The antistatic agents of the invention can be brought into the thermoplastic synthetic resins in the following ways. For example, the synthetic resin can be worked with the antistatic agent in a commercial mixer to a homogenous composition. The antistatic agent can be incorporated into the synthetic resin present in the form of granulates, chips or powder, as its solution, dispersion, suspension or emulsion in a suitable solvent, for example methanol or chloroform. After powerfully stirring the mixture and removal of the organic solvent the synthetic resin is shaped by customary processes, for example on mixing rolls with heated rolls or in an extruder. The antistatic agent, however, can also be worked in directly into the synthetic resin on the rolls or in an extruder. Furthermore, there can be mixed into the synthetic resin a higher amount of the antistatic agent than desired, whereby a so-called master batch is produced, which after being shipped to another factory then can simply be mixed with further synthetic resin to produce the desired above given final concentration of the antistatic agent.

It could not be foreseen that the antistatic agents would also be so highly effective in polymethacrylates, e.g., polymethyl methacrylate and polybutyl methacrylate and other polyalkyl methacrylates. For example, in making cast polymethyl methacrylate glass they can be added with the catalyst to the methyl methacrylate monomer which is then polymerized and formed in conventional manner at elevated temperature. However, the antistatic compounds can also be mixed into a solution of polymethyl methacrylate in an organic solvent, for example toluene, and thereby there is obtained an antistatically finished polymethyl methacrylate resin, which is outstandingly suitable for example, as a finishing lacquer for synthetic leather. The effective concentrations of the compounds of the invention in polymethyl methacrylate likewise are 0.01 to 5%, preferably 0.1 to 3%, based on the weight of the polymer. The antistatic agents of the invention are also outstandingly effective in preparations applied externally to the polymer.

The production of the in part new, antistatically effective materials is described in more detail in the following examples. These processes are exemplary only.

Unless otherwise indicated all parts and percentages are by weight.

1. N-methyl-N-(2,3-dihydroxypropyl)-N-(2'-hydroxydodecyl)-amine.

Two-thousand one-hundred and seventy grams of methylamine were introduced into 4550 ml of methanol at room temperature, whereupon there were dropped in 1288 grams of 1,2-epoxydodecane within 30 minutes at 20° C with stirring and water cooling and the mixture was allowed to stand for 24 hours with occasional stirring. After drawing off the excess methanol the residue was rectified. There were obtained 1284 grams (85.3% of theory) of N-methyl-N-(2-hydroxydodecyl) amine having a boiling point at 0.4 mm Hg of 130° C and a melting point of 67°-68° C.

One-thousand eighty grams of this material were then heated in 1740 ml of toluene to the boiling point and treated with stirring with 380 grams of glycidol within 1 hour. The mixture was allowed to react for another 2 hours under gentle boiling and then the toluene removed in a vacuum. There were obtained 1446 grams (99.7% of theory) of a colorless crystallizate having a melting point of 56°-57° C.

| Analysis | C | H | N |
|---|---|---|---|
| Calculated: | 66.37 | 12.23 | 4.84 |
| Found: | 66.15 | 12.34 | 4.79 |
| Empirical Formula: $C_{16}H_{35}O_3N$ | | | |

2. N,N-dimethyl-N-(2,3-dihydroxypropyl)-N-(2'-hydroxydodecyl) ammonium methyl sulfate.

14.5 grams of N-methyl-N-(2,3-dihydroxypropyl)-N-(2'-hydroxydodecyl) amine produced according to example 1 were dissolved in 50 ml of dioxane and treated with 6.3 grams of dimethyl sulfate at 60° C with stirring. The mixture was allowed to react further for 1 hour at 60° C and the dioxane removed in a vacuum. There were obtained as a residue 20.8 grams (100% theory) of a yellowish, pasty material.

| Analysis | C | H | N | S |
|---|---|---|---|---|
| Calculated: | 52.5 | 10.0 | 3.37 | 7.71 |
| Found: | 52.37 | 9.77 | 3.52 | 7.92 |
| Empirical Formula: $C_{18}H_{41}O_7NS$ | | | | |

3. Inorganic salts of N-methyl-N-(2,3-dihydroxypropyl)-N-(2'-hydroxydodecyl) amine.

0.05 mole of N-methyl-N-(2,3-dihydroxypropyl)-N-(2'-hydroxydodecyl) amine were dissolved in 50 ml of isopropanol and treated under stirring with (a) 0.05 mole of nitric acid (65%), or (b) 0.05 mole of perchloric acid (70%), or (c) 0.025 mole of phosphoric acid (98%). After drawing off the solvent in a vacuum in each of (a), (b) and (c) there was obtained in almost quantitative yield the corresponding salt as a viscous, colorless to slightly yellow oil.

4. N-(2,3-dihydroxypropyl)-N-(2'-hydroxyoctyl) amine.

One-thousand one-hundred grams of ammonia gas was introduced into a mixture of 6 liters of ethanol and 1 liter of water and within 30 minutes there were dropped in at room temperature 320 grams of 1,2-epoxyoctane. The mixture was left at room temperature for 70 minutes under gentle stirring, then the solvent and excess ammonia drawn off and the residue rectified in a vacuu. There were obtained 277.6 grams (77.1% of theory) of 2-hydroxyoctyl amine having a boiling point (0.4 mm Hg) of 80° C.

108.8 grams of 2-hydroxyoctyl amine were dissolved in 500 ml of toluene, heated to reflux, treated within 10 minutes under stirring with 18.5 grams of glycidol and held at reflux for 2 hours. Subsequently, the solvent was drawn off and the excess amine distilled off in a vacuum. There were obtained as a residue 49.5 grams (90.5% of theory) of N-(2,3-dihydroxypropyl)-N-(2-hydroxyoctyl) amine which after recrystallization from ethylacetate gave colorless crystals having a melting point of 85°-90° C.

| Analysis | C | H | N |
|---|---|---|---|
| Calculated: | 60.27 | 11.52 | 6.39 |

-continued

| Analysis | C | H | N |
|---|---|---|---|
| Found: | 60.54 | 11.83 | 6.78 |
| Empirical Formula: $C_{11}H_{25}O_3N$ | | | |

5. Production of A Statistical $C_{11}$–$C_{14}$ Vicinal Hydroxyamine And Its Reaction With Glycidol.

An epoxidate obtained through the epoxidation of a mixture of olefins of chain length $C_{11}$ to $C_{14}$ with statistically distributed double bonds (iodine number 146) having an average molecular weight of 193 (titration of the epoxide against HBr in glacial acetic acid) was used as the starting material. Ninety-five grams of this epoxide were treated in a 1 liter shaking autoclave with 260 grams of aqueous ammonia (33%) and brought to reaction with shaking for 10 hours at 200° C. The phases were separated, the organic phase washed with water and dried over $Na_2SO_4$. A gas chromatographic control showed > 98% of reaction of the epoxide. A vacuum distillation gave 83.4 grams (86.8% of theory) of a colorless oil having a boiling range (0.2 mm Hg) of 80 to 130° C.

Molecular Weight
Theoretical 210 (based on the added epoxide)
Found 216 (titration of the amine against N/10 $HClO_4$)

Thirty grams of the hydroxyamine thus obtained were dissolved in 100 ml of toluene, heated to reflux and treated under stirring within 10 minutes with 20.7 grams of glycidol. The mixture was held for 2 hours at reflux and then the toluene was removed with the help of a rotary evaporator. There were obtained 49.5 grams (100% of theory) of a viscous oil.

Molecular Weight
Theoretical — 364 (based on the amine added)
Found — 365 (titration of the final product against N/10 $HClO_4$)

6. Salts of the N,N-dimethyl-N-(2,3-dihydroxypropyl)-N-(2'-hydroxydodecyl)-ammonium hydroxide.

Thirty-seven grams of N,N-dimethyl-N-(2-hydroxydodecyl) amine were dissolved in 335 ml of 70% aqueous ethanol, warmed to 70° C and at this temperature brought to reaction with 12.8 grams of glycidol. The mixture was subsequently stirred further for 1 hour at 70° C and cooled. The solution was diluted to 400 ml with ethanol and divided into two halves. The two portions were in each case neutralized to pH6 with (a) 67% aqueous nitric acid or (b) 70% of aqueous perchloric acid and the solvent removed in a vacuum. There were obtained (a) salt of nitric acid.

29.3 grams (100% of theory) of a light yellow jelly.

| Analysis | C | H | N |
|---|---|---|---|
| Calculated: | 55.74 | 10.49 | 7.65 |
| Found: | 55.49 | 10.53 | 7.51 |
| Empirical Formula: $C_{17}H_{38}O_6N_2$ | | | | b. salt of perchloric acid:
32.4 grams (100% of theory) of a honey yellow waxy mass

| Analysis | C | H | N | Cl |
|---|---|---|---|---|
| Calculated: | 50.50 | 9.50 | 3.45 | 8.80 |
| Found: | 50.35 | 9.25 | 3.17 | 8.47 |
| Empirical Formula: $C_{17}H_{38}O_7NCl$ | | | | |

Further compounds according to the invention are for example, N-ethyl-N-(2,3-dihydroxypropyl)-N-(2'-hydroxyoctadecyl)-amine and its hydrochloride, N-n-Propyl-N-(2,3-dihydroxypropyl)-N-(2'-hydroxyhexadecyl)-amine and its perchlorate, N-i-Butyl-N-(2,3-dihydroxpropyl)-N-(2'-hydroxydecyl-amine and its formate, N-N-Pentyl-N-(2,3-dihydroxypropyl)-N-(2'-hydroxytetradecyl-amine and its acetate, N-(2-hydroxyethyl)-N-(2,3-dihydroxypropyl)-N-(2'-hydroxyeicosyl)-amine and its propionate, N,N-Bis-[2,3-dihydroxypropyl]-N-[2'-hydroxycosyl ($C_{22}$-$C_{26}$)]-amine and its nitrate, N-ethyl-N-methyl-N-(2,3-dihydroxypropyl)-N-(2'-hydroxydodecyl)-ammonium-methylsulfate, N-Isopropyl-N-methyl-N-(2,3-dihydroxypropyl)-N-(2'-hydroxydodecyl)-ammonium-methylsulfate, N-(2,3-Dihydroxypropyl)-N-(2'-hydroxydodecyl)-amine, N-Methyl-N-(2,3-dihydroxypropyl)-N-(2'-hydroxyoctyl)-ammoniummethyl-sulfate, N-Methyl-N-(2,3-dihydroxypropyl)-N-(2-hydroxyoctadecyl)-amine and its perchlorate as well as its sec. phosphate, N-Methyl-N,N-di-(2,3-dihydroxypropyl)-N-(2'-hydroxydodecyl)-ammonium-methylsulfate, statistical N,N-Dimethyl-N-(2',3'-dihydroxypropyl)-vic.hydroxy-$C_{11-14}$-alkylammonium-methylsulfate, N,N-Dimethyl-N-(2,3-dihydroxypropyl)-N-(2'-hydroxyoctyl)-ammoniumperchlorate, N,N-Dimethyl-N-(2,3-dihydroxypropyl)-N-(2'-hydroxydodecyl/tetradecyl)-ammonium-perchlorate and -nitrate, N,N-Dimethyl-N-(2,3-dihydroxypropyl-N-(2'-hydroxydodecyl)-ammonium-chloride, N-(vic. Hydroxy-statistical $C_{11-14}$-alkyl)-N,N-di-(2,3-dihydroxypropyl)-ethylene-diammonium-diperchlorate, N-Benzyl-N-(2,3-dihydroxypropyl)-N-(2'-hydroxyoctyl)-amine and its lactate, N-(2,3- or 4-methylbenzyl)-N-(2,3-dihydroxypropyl)-N-(2'-hydroxydodecyl)-amine and its succinate, N-(2-, 3- or 4-monochlorbenzyl)-N-(2,3-dihydroxypropyl)-N-(2'-hydroxyhexadecyl)-amine and its tartrate, N-(2-, 3- or 4-monobrombenzyl)-N-(2,3-dihydroxypropyl)-N-(2'-hydroxypentadecyl)-amine and its glycolate, N-ethylamino-N-(2,3-dihydroxypropyl)-N-(2'-hydroxyhexacosyl)-amine and its oxalate, N-ethylaminoethyl-N-(2,3-dihydroxypropyl)-N-(2'-hydroxyoctadecyl)-amine and its adipate, N-Methylamino-n-propyl-N-(2,3dihydroxypropyl)-N-(2'-hydroxydodecyl)-amine and its maleate, N-(2-Hydroxyethyl-amino-ethyl)-N-(2,3-dihydroxypropyl)-N-(2'-hydroxyhexadecyl)-amine and its citrate, N-(2,3-Dihydroxypropylamino-hexyl)-N-(2,3-dihydroxypropyl)-N-(2'-hydroxydodecyl)-amine and its phthalate, N-(2-hydroxypropylamino-hexyl)-N-(2,3-dihydroxypropyl)-N-(2'-hydroxynonylamine and its benzene sulfonate, methanesulfonate as well as Hydroxyethanesulfonate, N-(2-Hydroxypropyl)-N-(2,3-dihydroxypropyl)-N-[2'-hydroxyalkyl ($C_9$ to $C_{12}$)]-amine and its phthalate, isophthalate as well as terephthalate.

Also, there can be used, for example, N-methyl-N-(2,3-dihydroxypropyl)-N-dodecyl amine, N,N-dimethyl-N-(2,3-dihydroxypropyl)-N-dodecyl ammonium methyl sulfate, N-methyl-N-(2,32,3-dihydroxypropyl)-N-dodecyl ammonium nitrate and the corresponding phosphate and perchlorate, N-(2,3-dihydroxypropyl)-N-octyl amine, N-ethyl-N-(2,3-dihydroxypropyl)-N-octadecyl amine and its hydrochloride, N-n-propyl-N-(2,3-dihydroxypropyl)-N-hexadecyl amine and its perchlorate, N-i-butyl-N-(2,3-dihydroxypropyl)-N-decyl amine and its formate, N-n-pentyl-N-(2,3-dihydroxypropyl)-N-tetradecyl amine and its acetate, N-(2-hydroxyethyl)-N-(2,3-dihydroxypropyl)-N-eicosyl amine and its propionate, N,N-bis (2,3-dihydroxypropyl)-N-cosyl ($C_{22}$–$C_{26}$) amine and its nitrate, N-ethyl-N-methyl-N-(2,3-dihydroxypropyl)-N-dodecyl ammonium methyl sulfate, N-isopropyl-N-methyl-N-(2,3-dihydroxypropyl)-N-dodecyl ammonium methyl sulfate, N-(2,3-dihydroxy propyl)-N-dodecyl amine, N-methyl-N-(2,3-dihydroxypropyl)-N-octyl ammonium methyl sulfate, N-methyl-N-(2,3-dihydroxypropyl)-N-octadecyl amine and its perchlorate as well as its sec. phosphate, N-methyl-N,N-di(2,3-dihydroxypropyl)-N-dodecyl ammonium methyl sulfate, N,N-dimethyl-N-(2,3-dihydroxypropyl)-N-octyl ammonium perchlorate, N,N-dimethyl-N-(2,3-dihydroxypropyl)-N-dodecyl/tetradecyl ammonium perchlorate and nitrate, N,N-dimethyl-N-(2,3-dihydroxypropyl)-N-dodecyl ammonium chloride, N-$C_{11}$ to $C_{14}$ alkyl-N,N-di(2,3-dihydroxypropyl)-ethylene diammonium diperchlorate, N-benzyl-N-(2,3-dihydroxypropyl)-N-octyl ammonium lactate, N-(2,3 or 4-methylbenzyl)-N-(2,3-dihydroxypropyl)-N-dodecyl amine and its succinate, N-(2,3 or 4-monochlorobenzyl)-N-(2,3-dihydroxypropyl)-N-hexadecyl amine and its tartrate, N-(2,3 or 4-monobromobenzyl)-N-(2,3-dihydroxypropyl)-N-pentadecyl amine and its glycolate, N-ethylamino-N-(2,3-dihydroxypropyl)-N-hexacosyl amine and its oxalate, N-ethylaminoethyl-N-(2,3-dihydroxypropyl)-N-octadecyl amine and its adipates, N-methylamino-n-propylN-(2,3-dihydroxypropyl)-N-dodecyl amine and its maleate, N-(2-hydroxyethylaminoethyl)-N-(2,3-dihydroxypropyl)-N-hexadecyl amine and its citrate, N-(2,3-dihydroxypropylaminohexyl)-N-2,3-dihydroxypropyl)-N-dodecyl amine and its phthalate, N-(2-hydroxypropylaminohexyl)-N-(2,3-dihydroxypropyl)-N-nonyl amine and its benzenesulfonate, methanesulfonate as well as hydroxyethanesulfonate, N-(2-hydroxypropyl)-N-(2,3-dihydroxypropyl)-N-($C_9$ to $C_{12}$ alkyl) amine and its phthalate, terephthalate as well as isophthalate.

EXAMPLES OF USE

In the following examples of using the antistatic acting compounds of the invention there are recorded the antistatic properties.

EXAMPLE 1

One-hundred parts by weight of high pressure polyethylene (Lupolen 2000H of BASF) were thoroughly mixed with 0.25 parts by weight of antistatic agent and homogenized on a two roll set of mixing rolls for 5 minutes at 125° C. The rolled sheet formed was comminuted and pressed at 150° C in a frame press to a 1 mm thick sheet within 8 minutes. The properties determined are set forth in the following Table 1.

The evaluation of the antistatic activity of the equipped synthetic resin was carried out by measuring the surface resistance according to DIN 53 482 (German Industrial Standard 53 482) with the Tera-Ohm-Meter, Type PM 6509 (manufacturer; Philips), whereby contacts of WTW (Wissenschaftlich technische Werkstatten in Weilheim, Bavaria) of Type OFZ 3 were used. In each case two measurements of the antistatic effect was carried out; the first immediately after the formation of the polyethylene sheet as a measure of the antistatic finishing in the processing state and the second after a conditioning time of 24 hours at 45% relative humidity as a measure of the speed of migration of the antistatic agent in the synthetic resin and as the final value of the antistatic activity.

Table 1

| Antistatic Agent | Surface Resistance (in Ohms) | |
|---|---|---|
| | As Formed | After Conditioning 24 hours at 45% rel. humidity |
| 1. None | $3.1 \times 10^{14}$ | $2.4 \times 10^{14}$ |
| 2. $CH_3$—$(CH_2)_9$—CH—$CH_2$—N—$CH_2$—CH—$CH_2OH$<br>　　　　　　　　$\|$　　　　$\|$　　　　$\|$<br>　　　　　　　OH　　$CH_3$　　OH | $3 \times 10^{10}$ | $7 \times 10^{8}$ |
| 3. The same as 2 + 0.02% pyrogenic silica (Aerosil 200) | $6 \times 10^{9}$ | $4 \times 10^{9}$ |
| 4. $CH_3$—$(CH_2)_{9-11}$—CH—$CH_2$—N—$CH_2$—CH—$CH_2OH$<br>　　　　　　　　　$\|$　　　　$\|$　　　　$\|$<br>　　　　　　　　OH　　$CH_3$　　OH | $8 \times 10^{11}$ | $4 \times 10^{9}$ |
| 5. $CH_3$—$(CH_2)_5$—CH—$CH_2$—NH—$CH_2$—CH—$CH_2OH$<br>　　　　　　　　$\|$　　　　　　　$\|$<br>　　　　　　　OH　　　　　　OH | $1 \times 10^{11}$ | $3 \times 10^{10}$ |
| 6. $CH_3$—$(CH_2)_9$—CH—$CH_2$—NH—$CH_2$—CH—$CH_2OH$<br>　　　　　　　　$\|$　　　　　　　$\|$<br>　　　　　　　OH　　　　　　OH | $3 \times 10^{12}$ | $3 \times 10^{10}$ |
| 7. $C_nH_{2n+1}$—CH—CH—$C_mH_{2m+1}$<br>　　　　　　$\|$　　$\|$<br>　　　　　OH　N($CH_2$—CH—$CH_2OH)_2$<br>　　　　　　　　　　　　$\|$<br>　　　　　　　　　　　OH<br>　　n + m = 9 to 12 | $1 \times 10^{10}$ | $7 \times 10^{10}$ |
| 8. $CH_3$—$(CH_2)_{17}$—N($CH_2$—CH—$CH_2OH)_2$<br>　　　　　　　　　　　　　$\|$<br>　　　　　　　　　　　　OH | $1 \times 10^{11}$ | $6 \times 10^{10}$ |
| 9. $CH_3$—$(CH_2)_{11}$—N($CH_2$—CH—$CH_2OH)_2$<br>　　　　　　　　　　　　　$\|$<br>　　　　　　　　　　　　OH | $5 \times 10^{10}$ | $5 \times 10^{9}$ |
| 10. $CH_3$—$(CH_2)_{11}$—N—$CH_2$—CH—$CH_2OH$<br>　　　　　　　　　$\|$　　　　　$\|$<br>　　　　　　　　$CH_3$　　　OH | $2 \times 10^{13}$ | $1 \times 10^{10}$ |
| Comparison Measurements (State of the Art) | | |
| 11. $C_{10}H_{21}$CH—$CH_2$—N($C_2H_4OH)_2$<br>　　　　$\|$<br>　　　OH<br>(According to U.S. Pat. No. 3,365,435 and U.S. Pat. No. 3,317,505) | $>1 \times 10^{13}$ | $>1 \times 10^{13}$ |

Table 1-continued

| Antistatic Agent | Surface Resistance (in Ohms) | |
|---|---|---|
| | As Formed | After Conditioning 24 hours at 45% rel. humidity |
| 12. $CH_3-(CH_2)_{9-11}-\underset{\underset{OH}{\mid}}{CH}-CH_2-N\diagup\hspace{-0.3em}\diagdown O$ (According to U.S. Pat. No. 3,308,111) | $2 \times 10^{14}$ | $9 \times 10^{13}$ |

EXAMPLE 2

One-hundred parts by weight of a hard polyvinyl chloride (PVC) mixture [from 100 parts by weight of polyvinyl chloride of the type SOLVIC 229 of Solvay, Belgium, 0.5 parts by weight of a liquid dibutyl-tin-mercaptide stabilizer (Irgastab ® 17M of Ciba-Geigy A.G.), 2.0 parts by weight of a liquid glycerol partial ester as a lubricant (Barolup ® LPL of Chemische Werke Munchen Otto Barlocher GmbH) and 0.3 parts by weight of stearic acid] were mixed in each case with one part by weight of antistatic agent and homogenized for five minutes at 180° C on a two roll mixing roll. The mixture was subsequently pressed in a frame press at 195° C to 1 mm thick sheets and the measurements carried out thereon, see Table 2.

The measurement of the antistatic activity according to DIN 53482 again was carried out both immediately and after conditioning at 45% relative humidity.

Table 2

| Antistatic Agent | Surface Resistance (in Ohms) | |
|---|---|---|
| | As Formed | After Conditioning 24 hours at 45% rel. humidity |
| None | $4 \times 10^{14}$ | $5 \times 10^{14}$ |
| $CH_3-(CH_2)_9-\underset{\underset{OH}{\mid}}{CH}-CH_2-\underset{\underset{CH_3}{\mid}}{N}-CH_2-\underset{\underset{OH}{\mid}}{CH}-CH_2OH$ | $2 \times 10^{11}$ | $5 \times 10^{10}$ |
| $CH_3-(CH_2)_{11}-\underset{\underset{CH_3}{\mid}}{N}-CH_2-\underset{\underset{OH}{\mid}}{CH}-CH_2OH$ | $7 \times 10^{10}$ | $6 \times 10^{10}$ |
| $[CH_3-(CH_2)_9-\underset{\underset{OH}{\mid}}{CH}-CH_2-\underset{\underset{C_2H_5}{\mid}}{\overset{\overset{CH_3}{\mid}}{N}}-CH_2CH-CH_2OH]^+ \hspace{1em} SO_4CH_3^-$ | $5 \times 10^{11}$ | $7 \times 10^{10}$ |
| $[CH_3-(CH_2)_9-\underset{\underset{OH}{\mid}}{CH}-CH_2-\underset{\underset{CH_3}{\mid}}{NH}-CH_2\underset{\underset{OH}{\mid}}{CH}-CH_2OH]^+ \hspace{1em} ClO_4^-$ | $1 \times 10^{10}$ | $3 \times 10^{10}$ |
| $[CH_3-(CH_2)_9-CH_2-\underset{\underset{CH_3}{\mid}}{NH}-CH_2-\underset{\underset{OH}{\mid}}{CH}-CH_2OH]_2^{2+} \hspace{1em} HPO_4^{2-}$ | $3 \times 10^{10}$ | $5 \times 10^{10}$ |
| $[CH_3-(CH_2)_9-\underset{\underset{OH}{\mid}}{CH}-CH_2-\underset{\underset{CH_3}{\mid}}{\overset{\overset{CH_3}{\mid}}{N}}-CH_2-\underset{\underset{OH}{\mid}}{CH}-CH_2OH]^+ \hspace{1em} ClO_4^-$ | $2 \times 10^{10}$ | $3 \times 10^9$ |
| $[CH_3-(CH_2)_9-\underset{\underset{OH}{\mid}}{CH}-CH_2-\underset{\underset{CH_3}{\mid}}{N}(CH_2\underset{\underset{OH}{\mid}}{CH}-CH_2OH)_2]^+ \hspace{1em} CH_3SO_4^-$ | $3 \times 10^{10}$ | $4 \times 10^{10}$ |
| $[CH_3-(CH_2)_{15}-\underset{\underset{OH}{\mid}}{CH}-CH_2-\underset{\underset{CH_3}{\mid}}{NH}-CH_2-\underset{\underset{OH}{\mid}}{CH}-CH_2OH]^+ \hspace{1em} ClO_4^-$ | $2 \times 10^{10}$ | $2 \times 10^{10}$ |
| $[CH_3-(CH_2)_{15}-\underset{\underset{OH}{\mid}}{CH}-CH_2-\underset{\underset{CH_3}{\mid}}{NH}-CH_2-\underset{\underset{OH}{\mid}}{CH}-CH_2OH]_2^{2+} \hspace{1em} HPO_4^{2-}$ | $2 \times 10^{10}$ | $2 \times 10^{10}$ |
| $[C_mH_{2m+1}-\underset{\underset{OH}{\mid}}{CH}-\underset{\underset{NH(CH_2-\underset{\underset{OH}{\mid}}{CH}-CH_2OH)_2}{\mid}}{CH}-C_nH_{2n+1}]^+ \hspace{1em} ClO_4^-$ m + n = 9 to 12 | $1 \times 10^{11}$ | $8 \times 10^{10}$ |

Table 2-continued

| Antistatic Agent | Surface Resistance (in Ohms) As Formed | After Conditioning 24 hours at 45% rel. humidity |
|---|---|---|
| $[C_mH_{2m+1}-\underset{OH}{CH}-\underset{\underset{CH_3}{\overset{|}{N}}-\underset{\underset{CH_3}{|}}{CH_2}-\underset{OH}{CH}-CH_2OH]^+}{CH}-C_nH_{2n+1}]$ $m+n=9$ to 12, $CH_3SO_4^-$ | $5 \times 10^{10}$ | $7 \times 10^{10}$ |
| $[CH_3-(CH_2)_{17}-\underset{H}{NH}-CH_2-\underset{OH}{CH}-CH_2OH]^+$ $ClO_4^-$ | $3 \times 10^{10}$ | $2 \times 10^{10}$ |
| $[CH_3-(CH_2)_{11}-\underset{CH_3}{N\!H}-CH_2-\underset{OH}{CH}-CH_2OH_2]^+$ $CH_3SO_4^-$ | $5 \times 10^{11}$ | $4 \times 10^{10}$ |
| $[CH_3-(CH_2)_{11}-\underset{CH_3}{N}-(CH_2-\underset{OH}{CH}-CH_2OH)_2]^+$ $CH_3SO_4^-$ | $9 \times 10^{10}$ | $2 \times 10^{10}$ |
| $[CH_3-(CH_2)_9-\underset{OH}{CH}-CH_2-\underset{CH_3}{\overset{CH_3}{N}}-CH_2-\underset{OH}{CH}-CH_2OH]^+$ $Cl^-$ | $8 \times 10^8$ | $1 \times 10^9$ |
| $[CH_3-(CH_2)_9-\underset{OH}{CH}-CH_2-\underset{CH_3}{\overset{CH_3}{N}}-CH_2-\underset{OH}{CH}-CH_2OH]_2^{2+}$ $SO_4^{--}$ | $4 \times 10^9$ | $3 \times 10^9$ |
| $[CH_3-(CH_2)_5-\underset{OH}{CH}-CH_2-\underset{CH_3}{\overset{CH_3}{N}}-CH_2-\underset{OH}{CH}-CH_2OH]^+$ $ClO_4^-$ | $6 \times 10^9$ | $1 \times 10^8$ |
| $[CH_3-(CH_2)_{9\,to\,11}\underset{OH}{CH}-CH_2$ $NO_3^-+[HOCH_2-\underset{OH}{CH}-CH_2-\underset{CH_3}{\overset{|}{N}}-CH_3]$ | $2 \times 10^9$ | $2 \times 10^9$ |
| $\left\{\begin{array}{l}[C_mH_{2m+1}\;\;\;-\underset{OH}{CH}-\underset{NH-CH_2}{CH}-C_nH_{2n+1}]\\ CH_2-NH_2-CH_2-CH_2\;\;CHOH\\ CHOH-CH_2OH\quad\quad\quad CH_2OH\end{array}\right\}_2^{2+}$ $(ClO_4)_2^{2-}$, $n+m=9$ to 12 | $4 \times 10^9$ | $2 \times 10^9$ |
| $[CH_3-(CH_2)_9-\underset{OH}{CH}-CH_2-\underset{H}{\overset{CH_3}{N}}-CH_2-\underset{OH}{CH}-CH_2]_2^{2+}$ $^-OOC-(CH_2)_4-COO^-$ | $8 \times 10^{10}$ | $3 \times 10^{10}$ |

EXAMPLE 3

Thirty parts of polymethyl methacrylate beads (Degalan LP 59/03 manufactured by Degussa) were dissolved in 70 parts of toluene and the solution treated each time with 0.15 parts of different antistatic agents according to the invention. The solution was then converted by a film drawing apparatus into a film of a thickness of 100 microns applied to a polytetrafluoroethylene plate and dried for 2 hours in a drying cabinet at 60° C. The antistatic activity was measured according to DIN 53482 both immediately and after 24 hours conditioning time at 45% relative humidity. The results are set forth in following Table 3.

Table 3

| Antistatic Agent | Surface Resistance (in Ohms) | |
| --- | --- | --- |
| | As Formed | After Conditioning 24 hours at 45% Rel. Humidity |
| None | $3 \times 10^{14}$ | $2 \times 10^{14}$ |
| $[CH_3-(CH_2)_{9-11}-\underset{OH}{CH}-CH_2-\underset{CH_3}{\overset{CH_3}{N}}-CH_2-\underset{OH}{CH}-CH_2OH]^+ \quad NO_3^-$ | $4 \times 10^9$ | $4 \times 10^9$ |
| $[CH_3-(CH_2)_9-\underset{OH}{CH}-CH_2-\underset{C_2H_5}{\overset{CH_3}{N}}-CH_2-\underset{OH}{CH}-CH_2OH]^+ \quad CH_3SO_4^-$ | $6 \times 10^9$ | $1 \times 10^9$ |
| $[CH_3-(CH_2)_9-\underset{OH}{CH}-CH_2-\underset{CH(CH_3)_2}{\overset{CH_3}{N}}-CH_2-\underset{OH}{CH}-CH_2OH]^+ \quad CH_3SO_4^-$ | $2 \times 10^9$ | $1 \times 10^{10}$ |
| $[CH_3-(CH_2)_9-\underset{OH}{CH}-CH_2-\underset{CH_3}{\overset{CH_3}{N}}-CH_2-\underset{OH}{CH}-CH_2OH]^+ \quad NO_3^-$ | $3 \times 10^9$ | $3 \times 10^9$ |
| $[CH_3-(CH_2)_5-\underset{OH}{CH}-CH_2-NH-CH_2-\underset{OH}{\overset{CH_3}{CH}}-CH_2OH]^+ \quad CH_3SO_4^-$ | $2 \times 10^{10}$ | $2 \times 10^9$ |
| $\left[\begin{array}{c} C_mH_{2m+1}-\underset{OH}{CH}-\underset{\underset{CH_3}{N}-CH_2-\underset{OH}{CH}-CH_2OH}{CH}-C_nH_{2n+1} \\ CH_3 \end{array}\right]^+ \quad CH_3SO_4^-$ <br> n + m = 9 to 12 | $4 \times 10^{10}$ | $1 \times 10^{10}$ |
| $[CH_3-(CH_2)_{11}-\underset{CH_3}{N}-(CH_2-\underset{OH}{CH}-CH_2OH)_2]^+ \quad CH_3SO_4^-$ | $4 \times 10^{10}$ | $3 \times 10^{10}$ |

In the analogous use of the antistatic agent

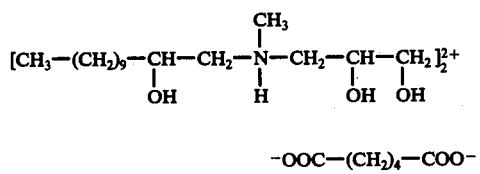

$-OOC-(CH_2)_4-COO-$ in polymethyl methacrylate in a concentration of 0.5 weight percent the surface resistance in the as formed condition was determined to be $1 \times 10^{12}$ ohms and after conditioning at 45% relative humidity $5 \times 10^{11}$ ohms.

EXAMPLE 4

In each case there was added to 100 parts of methyl methacrylate 0.5 part of an antistatic agent according to the invention and 0.5 parts of a dilauroyl peroxide hardener and the mixture cast between glass plates. The product was allowed to harden for 4 hours at 60° C and 2 hours at 100° C. After removal of the glass plates the antistatic effect was determined both immediately and after a conditioning time of 24 hours at 45% relative humidity. The measurements of the antistatic effects were carried out in the manner described above according to DIN 53482 and are collected in following Table 4.

Table 4

| Antistatic Agent | Surface Resistance (in Ohms) | |
| --- | --- | --- |
| | As Formed | After Conditioning 24 hours at 45% Rel. Humidity |
| None | $4 \times 10^{14}$ | $2 \times 10^{14}$ |
| $[CH_3-(CH_2)_9-\underset{OH}{CH}-CH_2-NH-CH_2-\underset{CH_3}{\overset{}{CH}}-\underset{OH}{CH_2OH}]^+ \quad NO_3^-$ | $1 \times 10^{10}$ | $1 \times 10^{10}$ |
| $[CH_3-(CH_2)_9-\underset{OH}{CH}-CH_2-\underset{CH_3}{\overset{CH_3}{N}}-CH_2-\underset{OH}{CH}-CH_2OH]^+ \quad NO_3^-$ | $8 \times 10^9$ | $8 \times 10^9$ |

Table 4-continued

| Antistatic Agent | Surface Resistance (in Ohms) | |
|---|---|---|
| | As Formed | After Conditioning 24 hours at 45% Rel. Humidity |
| $[CH_3-(CH_2)_{11}-\underset{\underset{CH_3}{\|}}{N}-(CH_2-\underset{\underset{OH}{\|}}{CH}-CH_2OH)_2]^+ \quad CH_3SO_4^-$ | $9 \times 10^9$ | $9 \times 10^9$ |
| $[CH_3-(CH_2)_{9-11}-\underset{\underset{OH}{\|}}{CH}-CH_2-\underset{\underset{CH_3}{\|}}{\overset{\overset{CH_3}{\|}}{N}}-CH_2-\underset{\underset{OH}{\|}}{CH}-CH_2OH]^+ \quad NO_3^-$ | $1 \times 10^{10}$ | $1 \times 10^{10}$ |

The antistatic agents of the invention are also very effective in lesser amounts in polyethylene as is shown in the following example.

EXAMPLE 5

In accordance with the procedure in "Use Example 1" there were produced test sheets from 100 parts by weight of high pressure polyethylene and 0.1 part by weight of antistatic agent. The results are set forth in following Table 5.

Table 5

| | Surface Resistance (in Ohms) After Conditioning at 45% Rel. Humidity | | |
|---|---|---|---|
| Antistatic Agent | As Formed | After 24 Hours | After 7 Days |
| N-Methyl-N-(2,3-dihydroxy-propyl)-N-(2'-hydroxydo-decyl)-amine | $5 \times 10^{11}$ | $7 \times 10^{10}$ | $8 \times 10^9$ |
| N,N-Bis-(2,3-dihydroxypro-pyl)-dodecylamine | $8 \times 10^{11}$ | $3 \times 10^{11}$ | $5 \times 10^{10}$ |

EXAMPLE 6

One-hundred parts by weight of polyvinyl chloride (present as a 1:1 mixture of two types of polyvinyl chloride: Solvic ® 333 of Deutsche Solvay-Werke, and Vinnol ® P 70 of Wacker-Chemie), 60 parts of dioctyl phthalate plasticizer, 0.5 parts of the tin stabilizer (Irgastab ® 17 M of Ciba-Geigy A.G.), 0.3 parts by weight of stearic acid, 2.0 parts by weight of the lubricant (Barolup LPL of Chemische Werke Munchen, Otto Barlocher GmbH) and 2.0 parts by weight of antistatic agent (as set forth in following Table 6) were worked into a polyvinyl chloride paste in the usual manner. The paste was then drawn into a 0.5 mm thick sheet on a glass plate and gelatinized for 15 minutes at 175° C in a circulatory oven. The results of the measurement of surface resistance are given in the following table.

Table 6

| Antistatic Agent | Surface Resistance (in Ohms) After 24 hours at 45% Rel. Humidity |
|---|---|
| $[C_{10}H_{21}-\underset{\underset{OH}{\|}}{CH}-CH_2-\underset{\underset{CH_3}{\|}}{\overset{\overset{CH_3}{\|}}{N}}-CH_2-\underset{\underset{OH}{\|}}{CH}-\underset{\underset{OH}{\|}}{CH_2}]^+ \quad ClO_4^-$ | $3 \times 10^8$ |
| $[C_{10}H_{21}-\underset{\underset{OH}{\|}}{CH}-CH_2-\underset{\underset{CH_3}{\|}}{\overset{\overset{CH_3}{\|}}{N}}-CH_2-\underset{\underset{OH}{\|}}{CH}-\underset{\underset{OH}{\|}}{CH_2}]^+ \quad Cl^-$ | $5 \times 10^8$ |
| $[C_{10}H_{21}-\underset{\underset{OH}{\|}}{CH}-CH_2-\underset{\underset{CH_3}{\|}}{\overset{\overset{CH_3}{\|}}{N}}-CH_2-\underset{\underset{OH}{\|}}{CH}-\underset{\underset{OH}{\|}}{CH_2}]_2^+ \quad SO_4^{--}$ | $1 \times 10^8$ |
| $[C_{10 \text{ to } 12}H_{21 \text{ to } 25}-\underset{\underset{OH}{\|}}{CH}-CH_2-\underset{\underset{CH_3}{\|}}{\overset{\overset{CH_3}{\|}}{N}}-CH_2-\underset{\underset{OH}{\|}}{CH}-\underset{\underset{OH}{\|}}{CH_2}]^+ \quad ClO_4^-$ | $2 \times 10^8$ |

EXAMPLE 7

In accordance with the procedure in "Use Example 1" there were produced test sheets from 100 parts by weight of polypropylene (Hostalen ® PPN 1060 of Hoechst AG) and 0.5 parts by weight of antistatic agent. The results are set forth in following Table 7.

Table 7

| | Surface Resistance (in Ohms) After Conditioning at 45% rel. Humidity | | |
|---|---|---|---|
| Antistatic Agent | As Formed | After 24 Hours | After 7 Days |
| N-Methyl-N-(2,3-dihydroxypro-pyl)-N-(2'-hydroxydodecyl)-amine | $1 \times 10^{14}$ | $1 \times 10^{13}$ | $9 \times 10^{10}$ |
| N,N-Bis-(2,3-dihydroxypro-pyl)-dodecylamine | $5 \times 10^{11}$ | $7 \times 10^{10}$ | $1 \times 10^{10}$ |

EXAMPLE 8

In accordance with the procedure in "Use Example 1" there were produced test sheets from 100 parts by weight of low pressure polyethylene (Lupolen ® 6041D of BASF A.G.) and 0.5 parts by weight of antistatic agent. The results are set forth in following Table 8.

Table 8

| Antistatic Agent | Surface Resistance (in Ohms) | |
|---|---|---|
| | As Formed | After 24 hours Conditioning at 45% rel. Humidity |
| N-Methyl-N-(2,3-dihydroxypropyl)-N-(2'-hydroxydodecyl)-amine | $2 \times 10^{12}$ | $3 \times 10^{10}$ |
| N,N-Bis-(2,3-dihydroxypropyl)-dodecylamine | $1 \times 10^{11}$ | $3 \times 10^{10}$ |

Production Of So-Called Master Batches Containing Antistatic Agents

EXAMPLE 9a

Twenty-five kg of polyethylene powder (Lupolen ® 2000H of BASF A.G.) were mixed for several minutes in a mixer with 1.31 kg of N-methyl-N-(2,3-dihydroxypropyl)-N-(2'-hydroxydodecyl)amine and 130 grams of a pyrogenic silica (Aerosil ® 200 of Degussa). The mixture was extruded over a planet roll extruder. The strands obtained were granulated. The production of sheets and films showed that the antistatic agent was perfectly distributed. (The use of the silica can be omitted in a given case. By its presence, however, these can be improved the working in of the antistatic agent.)

EXAMPLE 9b

In the same manner a 4% antistatic master batch was produced with N,N-bis-(2,3-dihydroxypropyl) dodecyl amine.

Production Of An Antistatic Agent Containing High Pressure Film Using The Master Batch of Example 9a

EXAMPLE 9c

There were produced films having a thickness of 50 microns from 19 parts by weight of high pressure polyethylene (Lupolen ® 2430 H of BASF A.G.) and 1 part by weight of the master batches produced in Examples 9a and b. The results of the measurement of resistance are set forth in Table 9 below.

Table 9

| Antistatic Agent | Content of Antistatic Agent in the Film in Weight Percent | Surface Resistance (in Ohms) After Conditioning at 45% Rel. Humidity | | |
|---|---|---|---|---|
| | | As Formed | After 24 Hours | After 7 Days |
| N-Methyl-N-(2,3-dihydroxypropyl)-N-(2'-hydroxydodecyl)-amine | 0.25 | $5 \times 10^{10}$ | $5 \times 10^{9}$ | $8 \times 10^{8}$ |
| N,N-Bis(2,3-dihydroxypropyl)-dodecylamine | 0.20 | $3 \times 10^{10}$ | $9 \times 10^{9}$ | $1 \times 10^{9}$ |
| For Comparison: Films Without Antistatic Agent | | $10^{14}$ | $5 \times 10^{13}$ | |

Examples of External Use Of The New Antistatic Agents

EXAMPLE 10

Sheets of the size 300 × 300 × 1 mm were produced from high pressure polyethylene (Lupolen 2000H of BASF A.G.) at 150° C within 8 minutes in a frame press. The sheets were produced between aluminum films in order to avoid any influence of an otherwise necessary parting agent.

For the external use of the antistatic agent there was first produced a stock solution in each case containing 20 grams of antistatic agent and a solvent mixture of isopropanol and twice distilled water in the ratio of 1:1 and filled to 100 ml. For the production of a 1% solution there were withdrawn 50 ml of the stock solution and filled up to 1000 ml with twice distilled water. For a 0.1% solution 5 ml of stock solution were correspondingly filled up to 1000 ml.

There were dipped into the 1.0% and 0.1% solutions 5 test articles of high pressure polyethylene for the measurement according to DIN 53482, drained and allowed to dry hanging free longitudinally in air. The measurements were made after 6 hours drying at 65% relative humidity and 20° C. The results are shown in following Table 10.

Table 10

| Antistatic Agent | Content of Antistatic Agent in the Solution in Percent (see above) | Surface Resistance (in Ohms) |
|---|---|---|
| N-Methyl-N-(2,3-dihydroxypropyl-N-(2'-hydroxydodecyl)-amine | 1.0 | $5 \times 10^{9}$ |
| | 0.1 | $8 \times 10^{10}$ |
| N,N-Bis-(2,3-dihydroxypropyl)-dodecylamine | 1.0 | $9 \times 10^{9}$ |
| | 0.1 | $4 \times 10^{10}$ |

The compositions can comprise, consist essentially of or consist of the materials set forth.

What is claimed is:

1. A composition comprising a thermoplastic synthetic resin containing an antistatically effective amount of a compound having the formula

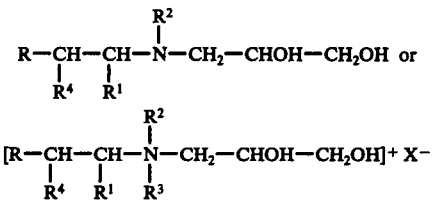

where

R and R¹ are alkyl groups in which the sum of the carbon atoms in the two alkyl groups is 4 to 30 carbon atoms, with the proviso that not over one of R and R¹ can be hydrogen, R² is 2-hydroxyethylaminoalkyl, 2-hydroxypropylaminoalkyl or 2,3-dihydroxypropylaminoalkyl, R³ is hydrogen or alkyl of 1 to 5 carbon atoms, R⁴ is hydroxy, and X⁻ is a monovalent inorganic or organic acid group or one equivalent of a polybasic inorganic or organic acid group.

2. A composition comprising a thermoplastic synthetic resin containing an antistatically effective amount of a compound having the formula

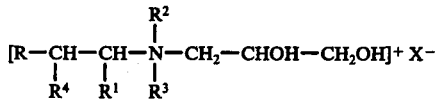

where
- R and R¹ are alkyl groups in which the sum of the carbon atoms in the two alkyl groups is 4 to 30 carbon atoms, with the proviso that not over one of R and R¹ can be hydrogen,
- R² is hydrogen, lower alkyl with 1 to 5 carbon atoms, 2-hydroxyethyl, 2-hydroxypropyl, 2,3-dihydroxypropyl, benzyl, methylbenzyl, chlorobenzyl, bromobenzyl, $C_2$ to $C_6$ aminoalkyl, $C_1$ to $C_6$ alkylamino $C_2$ to $C_6$ alkyl, 2-hydroxyethylamino $C_2$ to $C_6$ alkyl, 2-hydroxypropylamino $C_2$ to $C_6$ alkyl, or 2,3-dihydroxypropylamino $C_2$ to $C_6$ alkyl,
- R³ is hydrogen or alkyl of 1 to 5 carbon atoms,
- R⁴ is hydrogen or hydroxy, and
- X⁻ is a monovalent inorganic or organic acid group or one equivalent of a polybasic inorganic or organic acid group.

3. A composition according to claim 2 where R⁴ is hydroxy.

4. A composition according to claim 2 where R⁴ is hydrogen.

5. A composition comprising a thermoplastic synthetic resin containing an antistatically effective amount of a compound having the formula

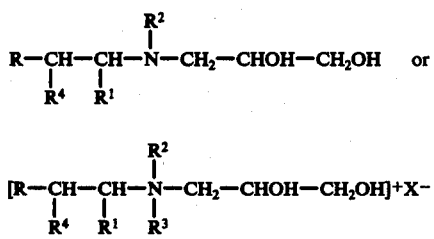

where
- R and R¹ are alkyl groups in which the sum of the carbon atoms in the two alkyl groups is 4 to 30 carbon atoms, with the proviso that not over one of R and R¹ can be hydrogen,
- R² is 2-hydroxyethylaminoalkyl, 2-hydroxypropylaminoalkyl or 2,3-dihydroxypropylaminoalkyl,
- R³ is hydrogen or alkyl of 1 to 5 carbon atoms,
- R⁴ is hydrogen, and
- X⁻ is a monovalent inorganic or organic acid group or one equivalent of a polybasic inorganic or organic acid group.

6. A composition comprising a thermoplastic synthetic resin which is polyvinyl chloride or polymethyl methacrylate containing an antistatically effective amount of a compound having the formula

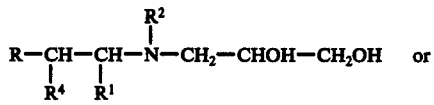

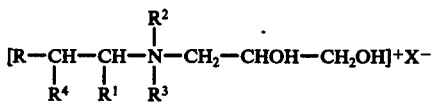

where
- R and R¹ are alkyl groups in which the sum of the carbon atoms in the two alkyl groups is 4 to 30 carbon atoms, with the proviso that not over one of R and R¹ can be hydrogen,
- R² is hydrogen, lower alkyl with 1 to 5 carbon atoms, 2-hydroxyethyl, 2-hydroxypropyl, 2,3-dihydroxypropyl, benzyl, methylbenzyl, chlorobenzyl, bromobenzyl, $C_2$ to $C_6$ aminoalkyl, $C_1$ to $C_6$ alkylamino $C_2$ to $C_6$ alkyl, 2-hydroxyethylamino $C_2$ to $C_6$ alkyl, 2-hydroxypropylamino $C_2$ to $C_6$ alkyl, or 2,3-dihydroxypropylamino $C_2$ to $C_6$ alkyl,
- R³ is hydrogen or alkyl of 1 to 5 carbon atoms,
- R⁴ is hydrogen or hydroxy, and
- X⁻ is a monovalent inorganic or organic acid group or one equivalent of a polybasic inorganic or organic acid group.

7. A composition according to claim 3 wherein when X⁻ is an organic acid group it is a carboxylic acid or sulfonic acid group.

8. A composition according to claim 3 wherein X⁻ is $CH_3SO_4^-$, $C_2H_5SO_4^-$, $ClO_4^-$, $R^5$-COO⁻ where $R^5$ is H, $C_1$ to $C_3$ alkyl, $CH_2OH$; $CH_3CHOH$ or $C_6H_5$, $NO_3^-$, Cl⁻, $R^6SO_3^-$ where $R^6$ is $CH_3$, $C_6H_5$, methylphenylene or $(OH)C_2H_4$ or an equivalent of $SO_4$ $HPO_4^{--}$ or $R^7(COO)_2^{--}$ where $R^7$ is a simple direct bond, $-(CH_2)_x-$ where x is 1 to 4, $-CH=CH$, $-CH(OH)-CH(OH)-$, $-CH_2-C(OH)(COOH)-CH_2-$ or phenylene.

9. A composition according to claim 5 wherein when X⁻ is an organic acid group it is a carboxylic acid or sulfonic acid group.

10. A composition according to claim 5 wherein X⁻ is $CH_3SO_4^-$, $C_2H_5SO_4^-$, $ClO_4^-$, $R^5$-COO⁻ where $R^5$ is H, $C_1$ to $C_3$ alkyl, $CH_2OH$; $CH_3CHOH$ or $C_6H_5$, $NO_3^-$, Cl⁻, $R^6SO_3^-$ where $R^6$ is $CH_3$, $C_6H_5$, methylphenylene or $(OH)C_2H_4$ or an equivalent of $SO_4=HPO_4=$ or $R^7(COO)_2^{--}$ where $R^7$ is a simple direct bond, $-(CH_2)_x-$ where x is 1 to 4, $-CH=CH$, $-CH(OH)-CH(OH)-$, $-CH_2-C(OH)(COOH)-CH_2-$ or phenylene.

11. A composition according to claim 6 wherein the polymer is polyvinyl chloride.

12. A composition according to claim 6 wherein the polymer is polymethyl methacrylate.

13. A compound according to claim 1 having formula I wherein R² is 2-hydroxyethylaminoalkyl, 2-hydroxypropylaminoalkyl or 2,3-dihydroxypropylaminoalkyl.

* * * * *